United States Patent
Johnstone et al.

[19]

[11] Patent Number: 6,133,829
[45] Date of Patent: Oct. 17, 2000

[54] WALK-THROUGH METAL DETECTOR SYSTEM AND METHOD

[75] Inventors: James Christian Johnstone, Livermore; Sidney Glenn Freshour, Modesto, both of Calif.

[73] Assignee: FRL, Inc., Los Banos, Calif.

[21] Appl. No.: 09/263,162

[22] Filed: Mar. 5, 1999

[51] Int. Cl.[7] .................................................. G08B 13/24
[52] U.S. Cl. ...................................... 340/551; 340/572.4
[58] Field of Search ................................. 340/551, 572.4, 340/540, 693.5, 572.8; 324/260, 259

[56] References Cited

U.S. PATENT DOCUMENTS

| | | |
|---|---|---|
| Re. 35,042 | 9/1995 | Anderson, III et al. . |
| 3,950,696 | 4/1976 | Miller et al. . |
| 3,956,743 | 5/1976 | Geiszler et al. . |
| 3,968,482 | 7/1976 | Schuman . |
| 3,971,983 | 7/1976 | Jaquet . |
| 4,068,164 | 1/1978 | Schwartz et al. ................. 324/226 |
| 4,274,090 | 6/1981 | Cooper . |
| 4,573,042 | 2/1986 | Boyd et al. . |
| 4,652,861 | 3/1987 | Domes . |
| 4,779,077 | 10/1988 | Lichtblau ............................ 340/572 |
| 4,812,822 | 3/1989 | Feltz et al. ........................ 340/572 |
| 4,821,023 | 4/1989 | Parks ................................. 340/551 |
| 4,906,973 | 3/1990 | Karbowski et al. . |
| 5,144,285 | 9/1992 | Gore . |
| 5,317,309 | 5/1994 | Vercellotti et al. . |
| 5,341,124 | 8/1994 | Leyden et al. . |
| 5,414,411 | 5/1995 | Lahr . |
| 5,463,376 | 10/1995 | Stoffer ............................... 340/572 |
| 5,521,583 | 5/1996 | Frahm et al. ...................... 340/551 |
| 5,541,577 | 7/1996 | Cooper et al. . |
| 5,576,621 | 11/1996 | Clements . |
| 5,583,488 | 12/1996 | Sala et al. . |
| 5,648,757 | 7/1997 | Vernace et al. . |
| 5,841,346 | 11/1998 | Park ................................... 340/540 |
| 5,859,532 | 1/1999 | Keller ................................. 324/232 |

*Primary Examiner*—Jeffery A. Hofsass
*Assistant Examiner*—Sihong Huang
*Attorney, Agent, or Firm*—Flehr Hohbach Test Albritton & Herbert LLP

[57] ABSTRACT

Walk-through ferrous metal detector and method in which potential carriers of weapons and other ferrous metal objects pass through a surveillance area in which the earth's magnetic field is monitored, and disturbances in the field due to movement of ferrous metal objects are detected.

25 Claims, 2 Drawing Sheets

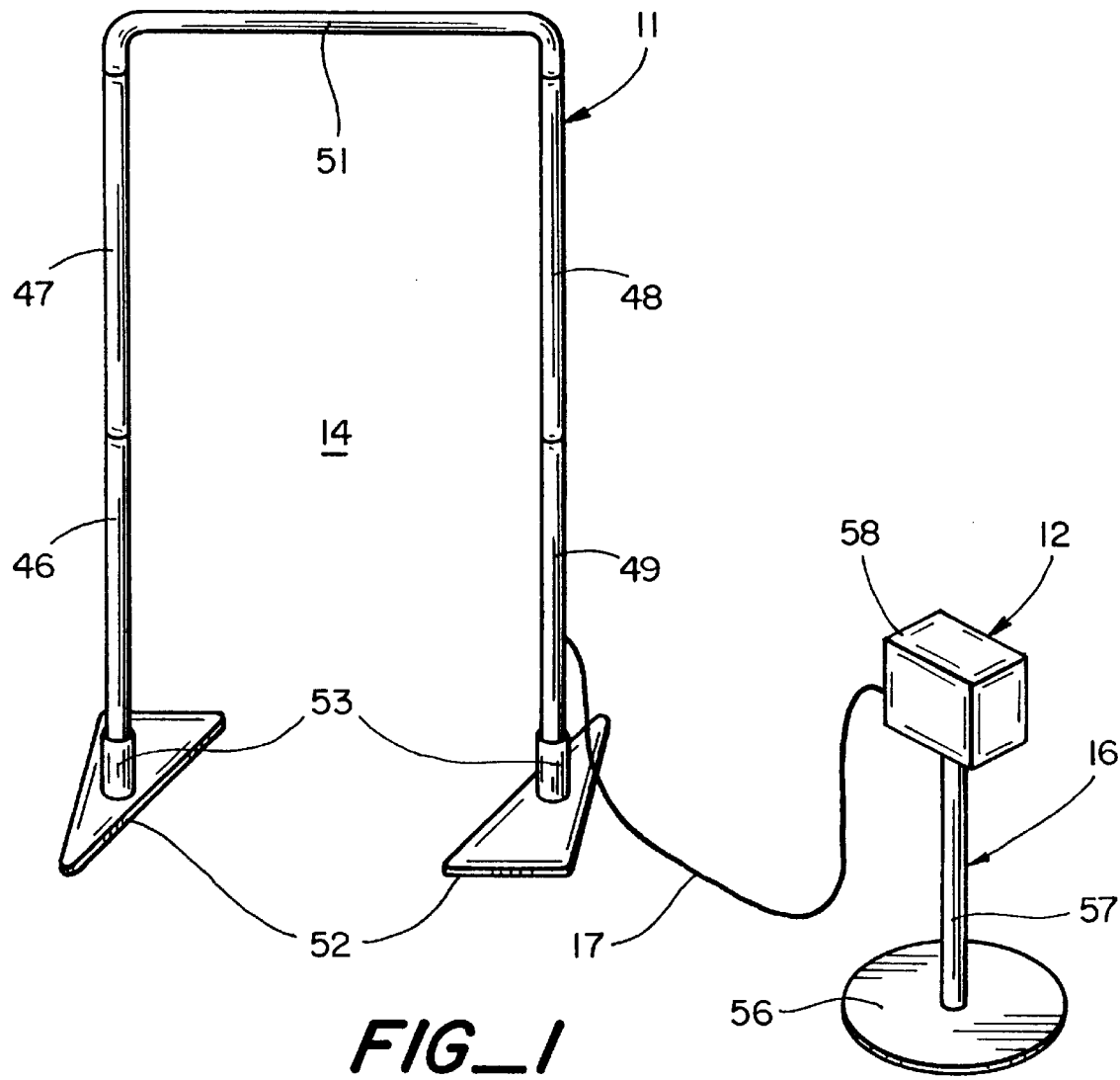
FIG_1
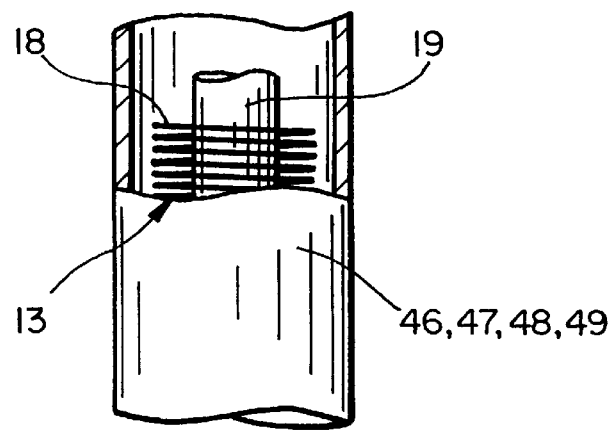
FIG_2

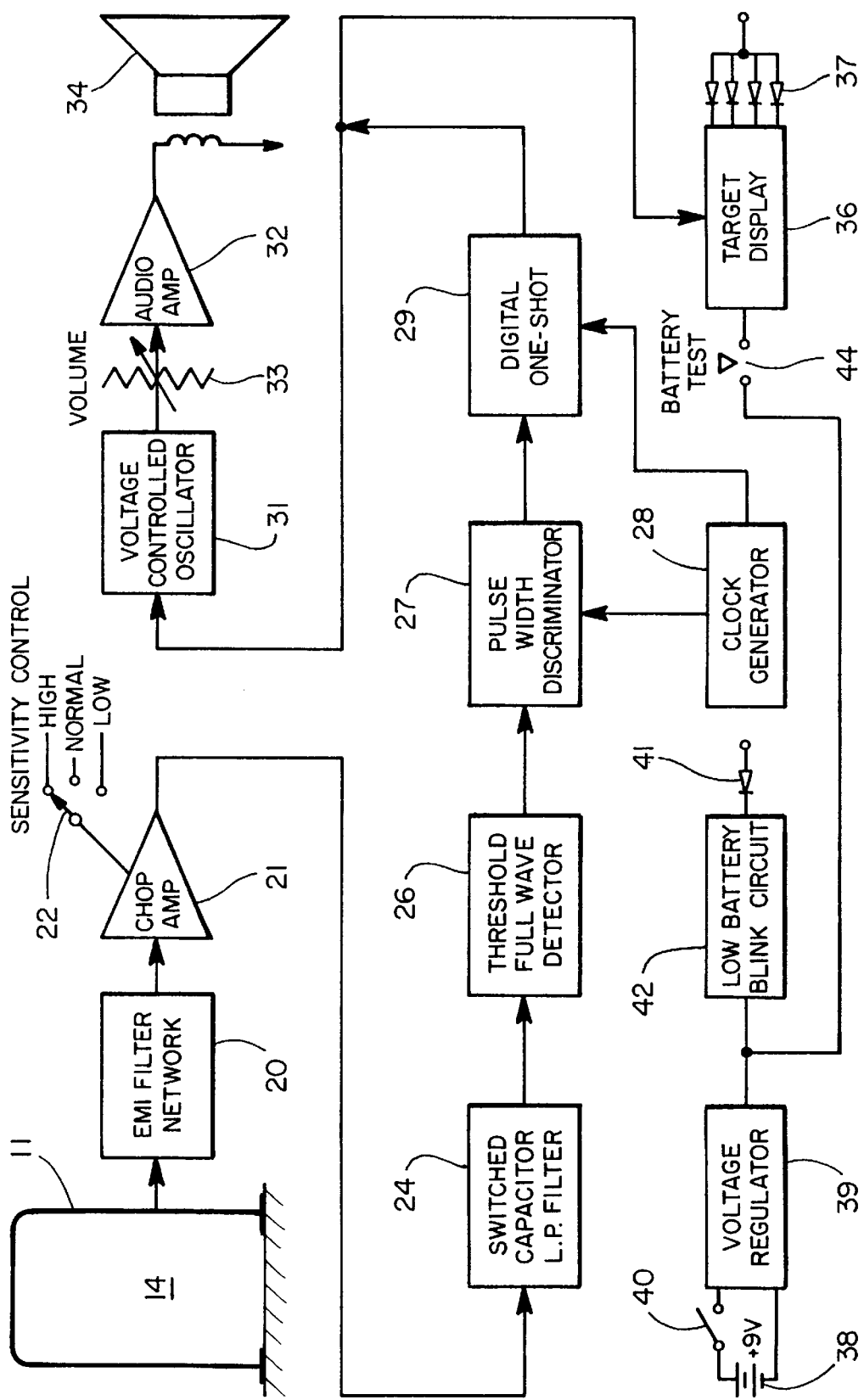
FIG_3

WALK-THROUGH METAL DETECTOR SYSTEM AND METHOD

This invention pertains generally to metal detectors and, more particularly, to a system and method for detecting weapons and other ferrous metal objects carried by a person.

Walk-through metal detectors are commonly used for detecting weapons in locations such airports and buildings where security is a concern. Such systems generally include large, permanent structures with transmitters for generating localized magnetic fields and means for detecting signals produced by metal objects carried by persons passing though those fields.

Those systems are relatively expensive, and have a further disadvantage in that they cannot be used in proximity to large stationary metal objects such as buildings or fences. If such objects are in the magnetic field, they will be detected unless the sensitivity of the system is reduced. When the sensitivity is reduced to a point where the large stationary objects are no longer detected, then certain guns and other weapons may not be detected either. Also, when such systems are moved, they often must be re-tuned to null out any metal in the floor on which they are used.

The prior art systems have a further disadvantage in that they respond to nonferrous metal objects (e.g., coins) as well as to ferrous ones.

It is in general an object of the invention to provide a new and improved walk-through metal detector and method for detecting weapons and other ferrous metal objects carried by a person.

Another object of the invention is to provide a metal detector and method of the above character which overcomes the limitations and disadvantages of the prior art.

These and other objects are achieved in accordance with the invention by providing a ferrous metal detector and method in which potential carriers of weapons and other ferrous metal objects pass through a surveillance area in which the earth's magnetic field is monitored, and disturbances in the field due to movement of ferrous metal objects are detected.

FIG. 1 is an isometric view, partly broken away, of one embodiment of a walk-through ferrous metal detector system incorporating the invention.

FIG. 2 is an enlarged fragmentary view, partly broken away, of the walk-through sensor frame in the embodiment of FIG. 1.

FIG. 3 is a block diagram of the embodiment of FIG. 1.

As illustrated in the drawings, the metal detector consists of a walk-through frame 11 and a control unit 12. The frame has a plurality of sensing coils 13 for monitoring magnetic flux within the area 14 bounded by the frame. The control unit is mounted on a separate stand or pedestal 16 and is connected to the sensing coils by a cable 17. The frame is of a size suitable for people to walk through and can, for example, have a height on the order of 77 inches and a width on the order of 32–36 inches.

The magnetic flux monitored by the sensing coils is produced by the earth's magnetic field, and the movement of ferrous metal objects such as weapons through the sensing frame causes localized disturbances in that field. The disturbances in the magnetic flux are in the form of a bell-shaped Gaussian curve, and the voltage induced by those disturbances is an analog signal which has an amplitude corresponding to the rate of change in the magnetic flux.

Each of the sensing coils consists of a large number of turns of copper wire 18 wound upon a ferrite core 19, and the coils are distributed throughout the frame to provide coverage for the entire area within it. The coils are connected together in oppositely phased pairs in order to cancel the effects disturbances produced by far field objects such as automobiles in motion. The coils in each pair are balanced to within about 1 percent of each other to contribute about 40 dB to the far field rejection.

The control unit is located far enough from the frame (e.g. 6–10 feet) so that large metal objects such as a police service revolver carried by persons operating the system will not be detected.

The control unit includes an EMI filter network 20 and an input amplifier 21 which amplifies the analog signals from the sensing coils to a level on the order of one volt. The amplitude of the signals from the coils varies widely, depending upon the size of the object which produces the disturbance, and in one presently preferred embodiment, the amplifier is a chopper stabilized operational amplifier which accommodates signals down to the microvolt level.

The gain of the input amplifier is controlled by a sensitivity control 22 to accommodate input signals of different amplitudes. In one presently preferred embodiment, the amplifier provides low, normal and high gains of 73 dB, 92 dB and 107 dB, respectively. At low gain, the system will detect weapons the size of a .22 caliber automatic pistol, and larger, and at normal gain, it will detect FAA test guns in which the only metal parts are the firing pin and spring. At high gain, it will detect small knives.

The amplified analog signals are passed through a low pass filter 24 which rejects small signals corresponding to motion faster than the normal walking speed of a person passing through the frame. It also eliminates stray 60 Hz disturbances and other spurious electrical noise. The filter has a cut-off frequency on the order of 1 Hz, and in one presently preferred embodiment, it is a 5-pole switched capacitor active filter.

Since the feet move at twice the speed of the body when a person is walking, the filter discriminates against disturbances produced by the metal shanks found in some shoes.

A threshold detector 26 connected to the output of the filter digitizes the analog signal and produces a pulse having a width corresponding to the amplitude and duration of the disturbance in the magnetic field. The threshold detector is a full-wave circuit which responds to both positive and negative excursions of the analog signal. The duration or width of the pulse thus represents the transit time of a ferrous object passing through the frame.

The width of the pulse is monitored by a pulse width discriminator 27 which passes pulses having a width corresponding to the time required for a person walking at a normal rate to pass through the area of surveillance. In one presently preferred embodiment, the pulse width discriminator consists of synchronous sequential logic which is clocked by clock signals from a clock generator 28 with a highly accurate ceramic resonator.

The target signal produced by the pulse width discriminator is applied to the input of a digital mono-stable latch or one-shot 29 which produces a single output pulse when triggered. This circuit comprises a digital flip-flop which is triggered by the target signal and reset by a counter driven by clock generator 28. The counter holds the flip-flop in an inactive or "off" "off" state for a period of about 2–3 seconds in order to prevent multiple triggering from a single target.

The output pulse from the one-shot is applied to a voltage controlled oscillator 31 which provides an audio signal having a duration corresponding to the width of the output pulse. The audio signal is applied to the input of an amplifier 32 through a volume control potentiometer 33, and the output of the amplifier is connected to a speaker 34 which provides an audible tone or "beep" in response to the target signal. With the duration of the "beep" determined by the period of the one-shot, the duration and volume of the "beep" will be the same regardless of the size of the target.

The output pulse from the one-shot is also applied to a target display 36 which includes a display driver and a plurality of light emitting diodes (LED's) 37 that are illuminated in response to the pulse to provide a visual indication that a ferrous metal object has been detected.

The system is powered by a pair of 9 volt batteries 38 through a voltage regulator 39 of conventional design. The batteries are connected to the voltage regulator by an ON-OFF switch 40 on with the volume control potentiometer. An LED 41 serves as a POWER ON indicator and is connected to the voltage regulator through a circuit 42 which monitors the level of the supply voltage and causes the LED to blink if the voltage falls to a level, e.g. 6 volts, which indicates that the batteries need to be replaced. The system can also be powered by an A.C. adapter (not shown), if desired.

The battery condition can also be monitored by LED's 37 and a test circuit in display driver 36 which illuminates different numbers of the LED's in accordance with the level of the supply voltage. In the embodiment illustrated, there are four LED's, and they are all illuminated when the supply voltage is 8.0 volts or higher. When the supply voltage is between 7.5 and 8.0 volts, three of the LED's are illuminated, and when the supply voltage is between 7.0 and 7.5 volts, two of the LED's are illuminated. When the supply voltage is between 6.2 and 7.0 volts, only one of the LED's is illuminated, and when it drops below 6.2 volts, LED 41 flashes. The supply voltage is applied to the test circuit by means of a test switch 44 which can, for example, be a normally open pushbutton switch on the volume control potentiometer.

In the preferred embodiment, frame 11 is constructed in the form of a knock-down portable frame which is readily transported to different locations and easily set up and taken down. It is fabricated of aluminum tubing, and includes four upright members 46–49 and a cross member 51 which are joined together by suitable connectors. The sensing coils are mounted inside the upright sections of tubing and are connected together by cables (not shown) as the sections are brought together. The frame is supported by a pair of triangular base plates 52 with upstanding posts 53 that receive the lower portions of upright sections 46, 49.

The pedestal or stand 16 for control unit 12 is likewise constructed in knock-down form, and includes a base plate 56 and a post 57. The control unit is enclosed within a cabinet 58 which is mounted on the post.

Operation and use of the metal detector, and therein the method of the invention, are as follows. The system is transported to a desired location, and the frame and control unit are set up, with the control unit about 6–10 feet from the frame. Persons to be checked for weapons then walk through the frame, and any ferrous objects carried by them will produce disturbances in the earth's magnetic field.

The sensing coils produce signals corresponding to the disturbances, and those signals are analyzed to detect the presence of a weapon. The signals are first increased in amplitude by amplifier 21, then passed through low pass filter 24 which eliminates signals corresponding to motion faster than the normal walking speed of a person passing through the frame. The analog signal is then digitized by threshold detector 26 to produce a pulse having a width corresponding to the transit time of the object which produced the disturbance. When the transit time corresponds to that of a person walking through the area of surveillance, pulse width discriminator 27 delivers a target signal which triggers digital one-shot 29. In response, an audible tone or "beep" is delivered by speaker 34, and LED's 37 are illuminated to indicate the presence of a weapon.

Since threshold detector 26 is a full-wave circuit which responds to both positive and negative excursions of the analog signal, the system is able to detect magnetized objects as well as nonmagnetized ferrous ones. Magnetized objects moving through the field produce a signals of relatively large residual magnitude which can be either positive or negative in polarity, depending on how the objects are oriented and where they are located relative to the sensing coils when they pass through the frame. Nonmagnetized ferrous objects can also produce signals of either polarity, and with a half-wave circuit, only a portion of the signals would be detected. In addition, with the full-wave circuit, subjects can walk through the frame in either direction.

The invention has a number of important features and advantages. It is a passive system which does not generate any magnetic fields of its own, and consequently can be used in locations where active systems cannot be used. It is highly portable and easy to set up and take down, which makes it suitable for use in places where larger, more expensive systems cannot be used. It is capable of detecting a wide range of ferrous objects, and can detect objects which are magnetized as well as ferrous objects which are not. Subjects can walk through the frame in either direction.

The total system weighs only about 60 pounds and breaks down to fit into two compact carrying cases which will fit into the trunks of most cars. It operates on only two 9 volt transistor batteries, and can be set up by one person in about 5–10 minutes. It is economical to manufacture, and can be sold for substantially less than other walk-through metal detectors. Being passive, it will not affect pacemakers, and being a motion detector, it can be used in proximity to large stationary metal objects. It has only two controls for an operator to learn to use, and requires a minimum of training. Since it detects ferrous objects only, it does not produce false signals in response to coins, keys and other objects that will set off other systems, and it can be used in close proximity to large nonferrous objects, both stationary and moving.

It is apparent from the foregoing that a new and improved ferrous metal detector and method have been provided. While only certain presently preferred embodiments have been described in detail, as will be apparent to those familiar with the art, certain changes and modifications can be made without departing from the scope of the invention as defined by the following claims.

What is claimed is:

1. In a system for detecting weapons and other ferrous metal objects: a portable, knock-down frame having a pair of nonferrous tubular uprights defining a surveillance area through which objects can pass, a plurality of sensing coils mounted inside the tubular uprights in vertical coaxial alignment and connected together in oppositely phased pairs for monitoring the earth's magnetic field within the surveillance area, and means connected to the sensing coils for detecting a disturbance in the earth's magnetic field due to movement of a ferrous metal object in the surveillance area.

2. In a system for detecting weapons and other ferrous metal objects: a frame defining a surveillance area through which objects can pass, a plurality of sensing coils carried by the frame for monitoring the earth's magnetic field within the surveillance area, means for amplifying a signal from the sensing coils, means for digitizing the amplified signal to provide a pulse having a width corresponding to the time the amplified signal is above a predetermined level, and means for monitoring the width of the pulse and providing a target signal when the pulse is of predetermined width.

3. The system of claim 2 further including a low pass filter having a cutoff frequency on the order of 1 Hz connected between the means for amplifying the signal from the sensing coils and the means for digitizing the amplified signal.

4. The system of claim 2 wherein the means for digitizing the amplified signal comprises a full wave threshold detector which responds to both positive and negative excursions of the amplified signal.

5. The system of claim 2 further including means for providing a single pulse of predetermined width in response to the target signal.

6. The system of claim 5 further including means responsive to the pulse of predetermined width for providing an audible indication that a ferrous metal object has been detected.

7. The system of claim 5 further including means responsive to the pulse of predetermined width for providing a visual indication that a ferrous metal object has been detected.

8. The system of claim 5 wherein the means for providing a single pulse of predetermined width comprises a digital one-shot circuit which is triggered by the target signal and then held in an inactive state for a predetermined period of time to prevent multiple responses to the target signal.

9. In a method of detecting weapons and other ferrous metal objects, the steps of: assembling a plurality of non-ferrous tubular members to form a pair of uprights on opposite sides of a surveillance area, passing potential carriers of weapons and other ferrous metal objects through the surveillance area, monitoring the earth's magnetic field within the surveillance area with sensing coils disposed in vertical coaxial alignment inside the tubular members, and detecting a disturbance in the earth's magnetic field produced by movement of a ferrous metal object in the surveillance area.

10. In a method of detecting weapons and other ferrous metal objects, the steps of: passing potential carriers of weapons and other ferrous metal objects through a surveillance area, monitoring the earth's magnetic field within the surveillance area with sensing coils, amplifying a signal from the sensing coils, digitizing the amplified signal to provide a pulse having a width corresponding to the time the amplified signal is above a predetermined level, monitoring the width of the pulse, and providing a target signal when the pulse is of predetermined width.

11. The method of claim 10 further including the step of passing the amplified signal through a low pass filter having a cutoff frequency on the order of 1 Hz before the amplified signal is digitized.

12. The method of claim 10 wherein the amplified signal is digitized by a full wave threshold detector which responds to both positive and negative excursions of the amplified signal.

13. The method of claim 10 further including the step of providing a single pulse of predetermined width in response to the target signal.

14. The method of claim 13 further including the step of providing an audible indication that a ferrous metal object has been detected in response to the pulse of predetermined width.

15. The method of claim 13 further including the step of providing a visual indication that a ferrous metal object has been detected in response to the pulse of predetermined width.

16. The method of claim 13 wherein the single pulse of predetermined width is provided by triggering a digital one-shot circuit in response to the target signal and then holding the circuit in an inactive state for a predetermined period of time to prevent multiple responses to the target signal.

17. In a walk-through ferrous metal detector for detecting a weapon carried by a person: means defining an area of surveillance though which a person can walk, means for monitoring the earth's magnetic field within the area of surveillance and providing an analog signal corresponding thereto, means for digitizing the analog signal to provide pulses corresponding to disturbances in the field, and means for monitoring the width of the pulses to detect a disturbance corresponding to movement of a ferrous metal object at a normal walking speed.

18. The walk-through ferrous metal detector of claim 17 including means for filtering the analog signal to remove components having a frequency above about 1 Hz.

19. The walk-through ferrous metal detector of claim 17 wherein the means for digitizing the analog signal comprises a full wave threshold detector which responds to both positive and negative excursions of the analog signal.

20. The walk-through ferrous metal detector of claim 17 further including means for providing a single pulse of predetermined width in response to detection of a disturbance corresponding to movement of a ferrous metal object at a normal walking speed.

21. The walk-through ferrous metal detector of claim 20 further including means responsive to the pulse of predetermined width for providing an audible indication that a ferrous metal object has been detected.

22. The walk-through ferrous metal detector of claim 20 further including means responsive to the pulse of predetermined width for providing a visual indication that a ferrous metal object has been detected.

23. The walk-through ferrous metal detector of claim 20 wherein the means for providing a single pulse of predetermined width comprises a digital one-shot circuit which is triggered upon detection of a disturbance corresponding to movement of a ferrous metal object at a normal walking speed and then held in an inactive state for a predetermined period of time thereafter.

24. In a walk-through ferrous metal detector for detecting a weapon carried by a person: a knock-down portable frame having a plurality of nonferrous tubular members assembled together to form a pair of uprights on opposite sides of a surveillance area through which a person can walk, sensing coils mounted in the tubular members in coaxial vertical alignment with each other in each of the uprights and connected together in oppositely phased pairs for monitoring the magnetic field within the surveillance area, and means coupled to the sensing coils for detecting a disturbance in the magnetic field produced by movement of a ferrous metal object in the surveillance area.

25. A portable walk-through metal detector, comprising a pair of tubular uprights positioned on opposite sides of a surveillance area in which moving ferrous metal objects can be detected by disturbances they produce in a steady-state reference magnetic field, vertically paired sensing coils mounted in the uprights for monitoring the magnetic field within the surveillance area, and means connected to the sensing coils for detecting a disturbance in the reference field.

\* \* \* \* \*